United States Patent
Lo et al.

(10) Patent No.: US 8,078,226 B2
(45) Date of Patent: Dec. 13, 2011

(54) MULTIPLE INTERFACE CARD IN A MOBILE PHONE

(75) Inventors: Ying-Che Lo, Hsinchu (TW); Huan-Chin Luo, Taipei (TW); Albert Sun, Hsinchu (TW); Pao-Chieh An, Taipei (TW)

(73) Assignee: Mxtran, Inc., Hsinchu (TW)

( * ) Notice: Subject to any disclaimer, the term of this patent is extended or adjusted under 35 U.S.C. 154(b) by 847 days.

(21) Appl. No.: 11/972,919

(22) Filed: Jan. 11, 2008

(65) Prior Publication Data
US 2009/0061933 A1  Mar. 5, 2009

Related U.S. Application Data

(60) Provisional application No. 60/968,762, filed on Aug. 29, 2007.

(51) Int. Cl.
*H04M 1/00* (2006.01)

(52) U.S. Cl. ........................................................ 455/558

(58) Field of Classification Search ............... 455/575.1, 455/575.3, 575.4, 347, 348, 349, 90.1, 90.2, 455/90.3, 403, 407, 558, 456.1, 557, 131; 439/218, 138, 92; 340/572.1–572.8, 539.1, 340/539.17, 541, 507
See application file for complete search history.

(56) References Cited

U.S. PATENT DOCUMENTS

| | | | |
|---|---|---|---|
| 6,045,043 A | 4/2000 | Bashan et al. | |
| 6,168,083 B1 | 1/2001 | Berger et al. | |
| 6,766,952 B2 | 7/2004 | Luu | |
| 6,839,772 B1 | 1/2005 | Kowalski et al. | |
| 6,969,282 B2 * | 11/2005 | Liu | 439/630 |
| 6,978,940 B2 | 12/2005 | Luu | |
| 7,114,659 B2 | 10/2006 | Harari et al. | |
| 7,156,314 B2 | 1/2007 | Kargl et al. | |
| 7,178,736 B2 * | 2/2007 | Yu et al. | 235/486 |
| 7,246,750 B2 * | 7/2007 | Cho | 235/492 |
| 7,365,642 B2 * | 4/2008 | Tabayashi et al. | 340/505 |
| 7,520,438 B2 * | 4/2009 | Kim et al. | 235/492 |
| 7,764,977 B2 * | 7/2010 | Kemppinen | 455/558 |
| 2003/0189096 A1 * | 10/2003 | Markkanen et al. | 235/451 |
| 2004/0129785 A1 | 7/2004 | Luu | |
| 2008/0014867 A1 * | 1/2008 | Finn | 455/41.1 |

OTHER PUBLICATIONS

International Standard ISO/IEC 7816-2, "Information Technology—Identification Cards—Integrated Circuit(s) Cards with Contacts", Part 2: Dimensions and Locations of the Contacts, Mar. 1, 1999, consisting of 9 pages.
ISO/IEC Chip Card Standards, Technical Notes: ISO/IEC 7816, http://www.cyberd.co.uk./support/technotes/smartcards.htm, dated Jul. 31, 2007, pp. 1-6.
Dr. Klaus Vedder "Intermodal Means of Payment or the Contactless SIM" Chairman ETSI Project Smart Card Platform (EP SCP) Executive VP, Gieseck & Devrient, 2004, 19 pages.

* cited by examiner

*Primary Examiner* — Melody Mehrpour
(74) *Attorney, Agent, or Firm* — Kenta Suzue; Haynes Beffel & Wolfeld LLP

(57) ABSTRACT

A multiple interface smart card adaptor is described for mobile phones to take advantage of at least wireless and contactless communications.

23 Claims, 6 Drawing Sheets

MULTIPLE INTERFACE CARD IN A MOBILE PHONE

RELATED APPLICATION

This application claims the benefit of U.S. Provisional Application No. 60/968,762, filed 29 Aug. 2007 by inventors Ying-Che Lo, Huan-Chin Luo, Albert Sun and Pao-Chieh An entitled Multiple Interface Card in a Mobile Phone. This application is incorporated herein by reference.

BACKGROUND

1. Background

The present technology relates generally to mobile phones, and more specifically to multiple interface mobile phones, in that there are interfaces enabled for at least wireless and contactless communications.

2. Description of Related Art

The use of electronic information storage cards such as smart cards has grown rapidly in recent years as mobile devices have increasingly replaced heavier, larger devices.

Smart cards can be used in a wide range of applications including Subscriber Identification Modules (SIMs) for mobile phones, credit or ATM cards, high-security identification and access-control cards, authorization cards for pay television, public transport and public phone payment cards. SIM cards are widely deployed and used around the world, particularly in countries that run Global System for Mobile Communications (GSM) cellular networks. A SIM card is an integrated circuit card about the size of a postage stamp with embedded integrated circuits. The embedded integrated circuits of the SIM card store information such as the identification of a mobile phone service subscriber, subscription information, preferences, saved telephone numbers, text messages and other type of information depending on the design.

SUMMARY

One aspect of the technology is an apparatus with a circuit board and multiple sets of electrical contact pads. The circuit board has two principal surface on opposite sides of the circuit board. The multiple sets of electrical contact pads include at least three sets of electrical contact pads. A first set of electrical contact pads is on the first principal surface. The first set of electrical contact pads is arranged to electrically connect with a mobile phone smart card. Thus, the first set of electrical contact pads communicates data of the mobile phone smart card for wireless and contactless communication. A second set of electrical contact pads is on the second principal surface. The second set of electrical contact pads is arranged to electrically connect with a smart card socket of a mobile phone. Thus, the second set of electrical contact pads communicates data with the smart card socket of the mobile phone for wireless communication. A third set of electrical contact pads is arranged on the circuit board to electrically connect with a contactless communication antenna external to the circuit board. Thus, the third set of electrical contact pads communicates data with the contactless communication antenna for contactless communication.

Contactless communication is over distances shorter than wireless communication. Examples of contactless communication are near field communication, and proximity and vicinity communication such as those compliant with ISO 14443 and/or ISO 15693. Examples of wireless communication are GSM, TDMA, CDMA, and various 3G and 4G standards.

Some embodiments further include the mobile phone smart card adjacent to the first principal surface of the circuit board.

Some embodiments further include the mobile phone. The mobile phone includes the mobile phone smart card socket adjacent to the second principal surface of the circuit board.

Some embodiments further include the contactless communication antenna. Some embodiments further include a battery providing power to the mobile phone, and the contactless communication antenna adjacent to the battery. In some embodiments the mobile phone has a housing surrounding the mobile phone which includes a removable battery cover, and the contactless communication antenna is on the battery cover.

Some embodiments further include various combinations of the mobile phone with smart card socket, the mobile phone smart card, and the contactless communication antenna, such as all three or any two.

Multiple embodiments variously locate contactless communication circuitry in the mobile phone smart card and in an integrated circuit on the circuit board.

In some embodiments, the mobile phone smart card has the contactless communication circuitry. The second set of electrical contact pads of the circuit board is electrically connected with at least one electrical contact pad of the first set of electrical contact pads of the circuit board. Thus, the first and second sets of electrical contact pads of the circuit board directly communicate data between the mobile phone smart card and the smart card socket of the mobile phone for wireless communication. The third set of electrical contact pads of the circuit board is electrically connected with at least one electrical contact pad of the first set of electrical contact pads of the circuit board. Thus, the first and third sets of electrical contact pads of the circuit board directly communicate data between the mobile phone smart card and the contactless communication antenna for contactless communication.

In some embodiments, the first set of electrical contact pads of the circuit board communicates data of the mobile phone smart card, such that the mobile phone smart card has a first set of smart card contact pads compliant with ISO 7816. In some embodiments, the mobile phone smart card has extra contact pads in addition to the first sets of smart card contact pads, whereby the extra contact pads support contactless communication of the mobile phone. In other embodiments, despite the mobile phone smart card having no extra contact pads, in addition to the first set of smart card contact pads, supporting contactless communication, the technology provides the mobile phone with contactless communication.

In some embodiments, the second set of electrical pads of the circuit board is arranged to electrically connect with the smart card socket of the mobile phone, such that the smart card socket has a first sets of socket contacts arranged to connect with the mobile phone smart card being compliant with ISO 7816, and the smart card socket has no extra socket contacts in addition to the first set of socket contacts supporting contactless communication. In other embodiments, despite the smart card socket having no extra socket contacts, in addition to the set of socket contacts, supporting contactless communication, the technology provides the mobile phone with contactless communication Some embodiments, further comprise at least one integrated circuit on the circuit board processing data of the mobile phone smart card for wireless and contactless communication. In some embodiments, the mobile phone smart card has no contactless communication circuitry. In other embodiments, the mobile phone smart card has contactless communication circuitry, in which case the contactless communication circuitry of the integrated circuit on the circuit board, and the contactless communication circuitry of the mobile phone smart card, are partly redundant.

Another aspect of the technology is a method of manufacturing the technology described herein. A circuit board having a first principal surface and a second principal surface on opposite sides of the circuit board is provided. A first set of electrical contact pads is provided on the first principal surface arranged to electrically connect with a mobile phone smart card, such that the first set of electrical contact pads communicates data of the mobile phone smart card for wireless and contactless communication. A second set of electrical contact pads is provided on the second principal surface arranged to electrically connect with a smart card socket of a mobile phone, such that the second set of electrical contact pads communicates data with the smart card socket of the mobile phone for wireless communication. A third set of electrical contact pads is provided, arranged on the circuit board to electrically connect with a contactless communication antenna external to the circuit board, such that the third set of electrical contact pads communicates data with the contactless communication antenna for contactless communication.

The antenna includes a connector that is detachable from the pair of wires from the flexible printed circuit board. Embodiments of the antenna can be manufactured by a wide variety of methods including etched metal lines on a printed circuit board, a wiring coil, or printing conducting wires onto a plastic paper.

The structures and methods of the present technology are disclosed in the detailed description below. This summary does not purport to define the invention. The invention is defined by the claims. These and other embodiments, features, aspects, and advantages of the technology can be understood with regard to the following description, appended claims and accompanying drawings.

DETAILED DESCRIPTION

Figure 1:
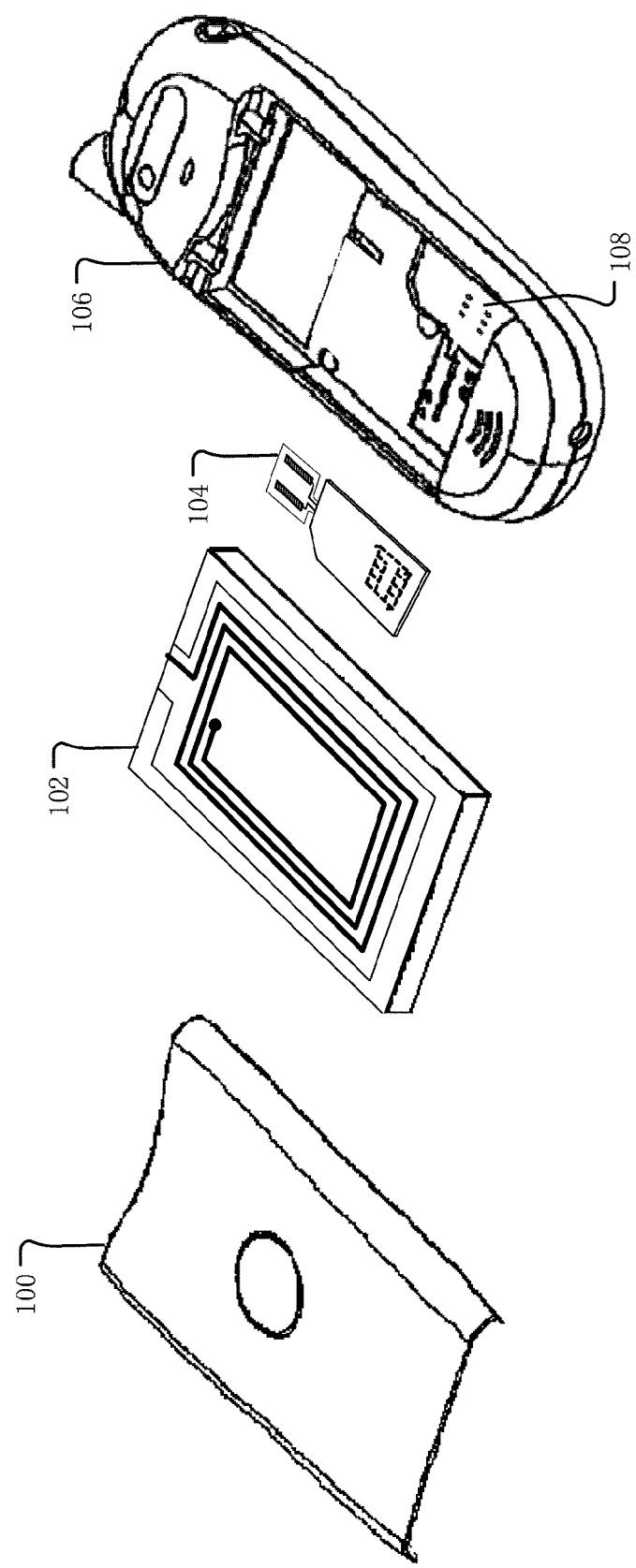
FIG. 1 shows an exploded perspective view of a mobile phone embodiment.

A description of structural embodiments and methods of the technology is provided. It is to be understood that there is no intention of limiting the invention to the specifically disclosed embodiments but that the invention may be practiced using other features, elements, methods and embodiments. Like elements in various embodiments are commonly referred to with like reference numerals.

FIG. 1 shows an exploded perspective view of a mobile phone embodiment. The mobile phone 106 has a smart card socket 108. The combined smart card/printed circuit board 104 is shaped to be placed physically into the smart card socket 108. The combined smart card/printed circuit board 104 has electrical contact pads arranged to electrically couple with the electrical contact pads in the smart card socket 108, when the combined smart card/printed circuit board 104 is placed physically into the smart card socket 108. The battery 102 has a contactless communication antenna. The contactless communication antenna has electrical contact pads arranged to electrically couple with contactless communication electrical contact pads of the combined smart card/printed circuit board 104, when the combined smart card/printed circuit board 104 is placed physically into the smart card socket 108, and the battery 102 is placed in the mobile phone 106. The housing of the mobile phone 106 includes a removable battery cover 100. In an other embodiment, the contactless communication antenna is on the removable battery cover 100. In such an embodiment, the contactless communication antenna has electrical contact pads arranged to electrically couple with contactless communication electrical contact pads of the combined smart card/printed circuit board 104, when the combined smart card/printed circuit board 104 is placed physically into the smart card socket 108, and the battery cover 100 is placed on the mobile phone 106.

Figure 2:
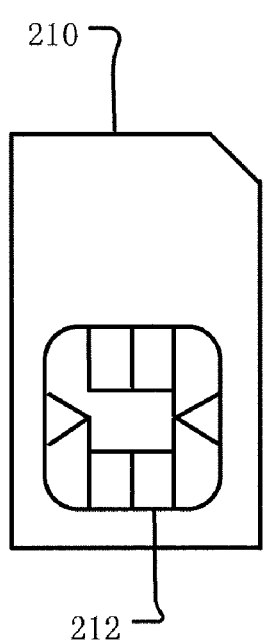
FIGS. 2 and 3 show top and bottom views of a mobile phone smart card in some embodiments.
Figure 3:
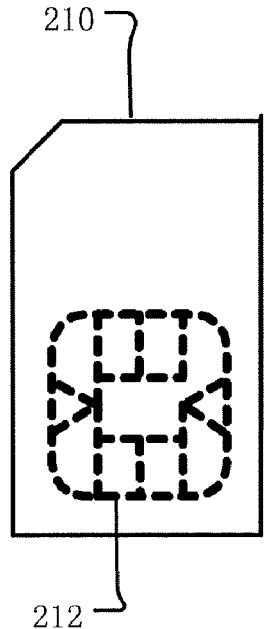

FIGS. 2 and 3 show top and bottom views of a mobile phone smart card in some embodiments. The mobile phone smart card 210 has a set of electrical contact pads 212 to communicate data of the mobile phone smart card 210.

Figure 4:
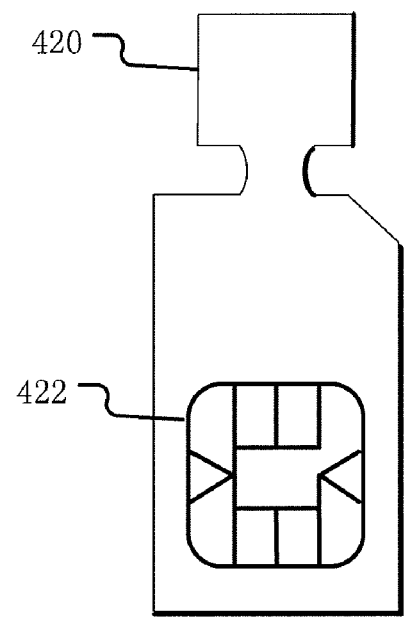
FIGS. 4 and 5 show top and bottom views of a printed circuit board embodiment.
Figure 5:
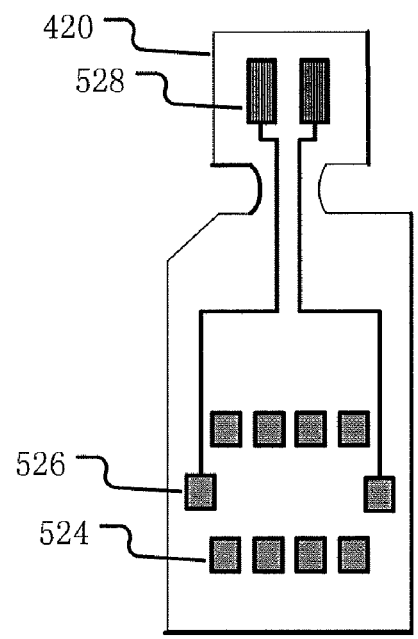

FIGS. 4 and 5 show top and bottom views of a printed circuit board embodiment. One side of a printed circuit board 420 has one set of electrical contact pads 422 arranged to connect with the smart card socket 108 of a mobile phone 106. The opposite side of the printed circuit board 420 has two sets of electrical contact pads—the set of electrical contact pads 524 and 526, and the set of electrical contact pads 528. The set of electrical contact pads 528 is arranged to connect with a contactless communication antenna external to the printed circuit board 420. The set of electrical contact pads 524 and 526 is arranged to connect with a mobile phone smart card 210. The set of electrical contact pads 524 are "pass through" contact pads that carry the same signal as the respective one of the electrical contact pads 422 from one side to the other of the printed circuit board 420. Out of the set of electrical contact pads 524 and 526, electrical contact pads 526 are electrically connected with the set of electrical contact pads 528 arranged to connect with a contactless communication antenna. Out of the set of electrical contact pads 524 and 526, electrical contact pads 524 are not electrically connected with the set of electrical contact pads 528 arranged to connect with a contactless communication antenna. In this embodiment, the mobile phone smart card includes contactless communication circuitry and therefore controls the contactless communication antenna.

Figure 6:
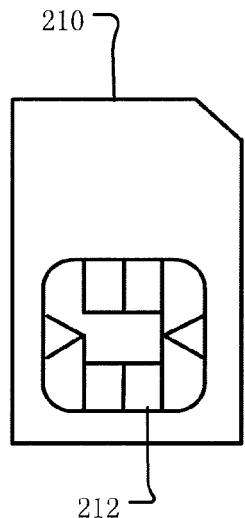
FIGS. 6 and 7 show top and bottom views, again, of a mobile phone smart card in some embodiments.
Figure 7:
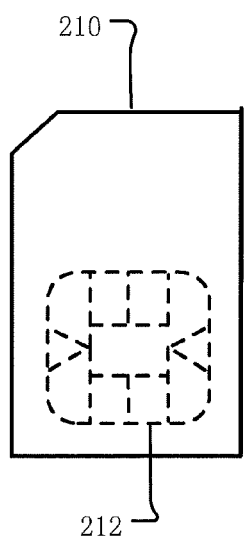

FIGS. 6 and 7 show top and bottom views, again, of a mobile phone smart card in some embodiments. The mobile phone smart card 210 has a set of electrical contact pads 212 to communicate data of the mobile phone smart card 210.

Figure 8:
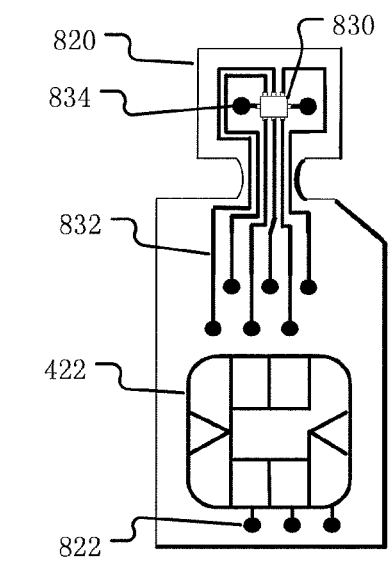
FIGS. 8 and 9 show top and bottom views of another printed circuit board embodiment.
Figure 9:
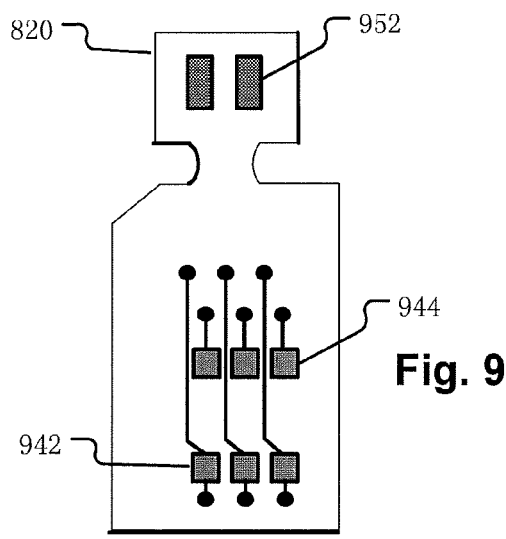

FIGS. 8 and 9 show top and bottom views of another printed circuit board embodiment. The printed circuit board 820 includes an integrated circuit 830 processing data of the smart card for wireless and contactless communication. One side of a printed circuit board 820 has one set of electrical contact pads 422 arranged to connect with the smart card socket 108 of a mobile phone 106. The opposite side of the printed circuit board 820 has two sets of electrical contact pads—the set of electrical contact pads 942 and 944, and the set of electrical contact pads 952. The set of electrical contact pads 952 is arranged to connect with a contactless communication antenna external to the printed circuit board 820. The set of electrical contact pads 942 and 944 is arranged to connect with a mobile phone smart card 210. Only some of the set of electrical contact pads 942 and 944 are "pass through" contact pads that carry the same signal as the respective one of the set of electrical contact pads 422 from one side to the other of the printed circuit board 820, as can be seen by the limited number of traces 822 that connect to the set of electrical contact pads 422 and carry signals from one side to the other side of the printed circuit board 820. The set of electrical contact pads 942 and 944, are electrically connected to the integrated circuit 830, as is evident from the traces 832 and the corresponding traces on the other side. Out of the set of electrical contact pads 942 and 944, electrical contact pads 944 are not directly electrically connected with the set of electrical contact pads 422. The integrated circuit 830 controls: the electrical contact pads 944 arranged to connected to the mobile phone smart card 210, and the set of electrical contact pads 952 arranged to connect with a contactless communication antenna.

In other embodiments, the integrated circuit and the set of electrical contacts arranged to connect with an external contactless communication antenna switch sides.

Figure 10:
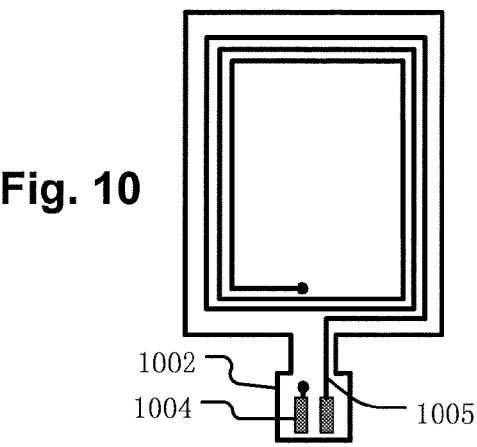
FIGS. 10 and 11 shows top and bottom views of a contactless communication antenna.
Figure 11:
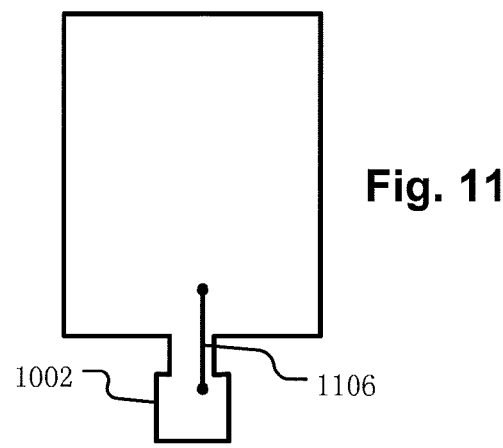

FIGS. 10 and 11 shows top and bottom views of a contactless communication antenna. The contactless communication antenna 1002 has electrical contact pads 1004 arranged to connect with a set of electrical contact pads on the printed circuit board arranged to connect with the contactless communication antenna (e.g., 528 in FIG. 5 and 952 in FIG. 9). The contactless communication antenna 1002 also has electrical traces 1005 and 1106 arranged according to the shape of the contactless communication antenna 1002 and the position of the electrical contact pads 1004.

Figure 12:
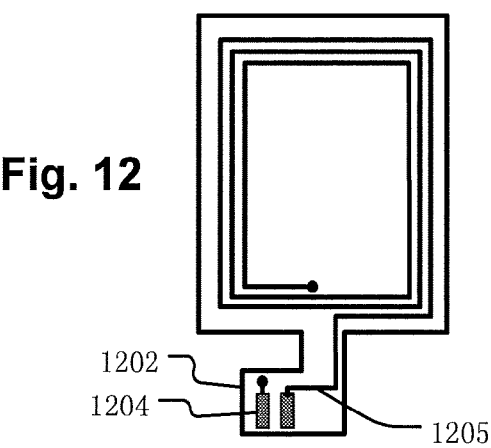
FIGS. 12 and 13 shows top and bottom views of a contactless communication antenna.
Figure 13:
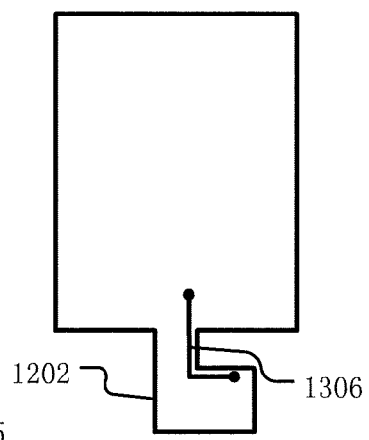

FIGS. 12 and 13 shows top and bottom views of a contactless communication antenna. The contactless communication antenna 1202 has electrical contact pads 1204 arranged to connect with a set of electrical contact pads on the printed circuit board arranged to connect with the contactless communication antenna (e.g., 528 in FIG. 5 and 952 in FIG. 9). The contactless communication antenna 1202 also has electrical traces 1205 and 1306 arranged according to the shape of the contactless communication antenna 1202 and the position of the electrical contact pads 1204.

Figure 14:
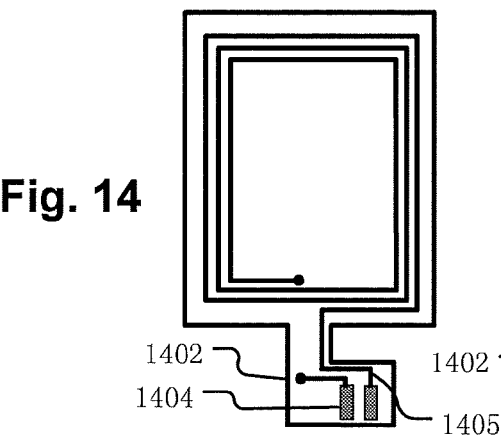
FIGS. 14 and 15 shows top and bottom views of a contactless communication antenna.
Figure 15:
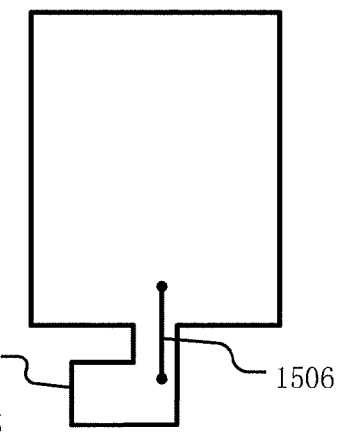

FIGS. 14 and 15 shows top and bottom views of a contactless communication antenna. The contactless communication antenna 1402 has electrical contact pads 1404 arranged to connect with a set of electrical contact pads on the printed circuit board arranged to connect with the contactless communication antenna (e.g., 528 in FIG. 5 and 952 in FIG. 9). The contactless communication antenna 1402 also has electrical traces 1405 and 1506 arranged according to the shape of the contactless communication antenna 1402 and the position of the electrical contact pads 1404.

Figures 16, 17:
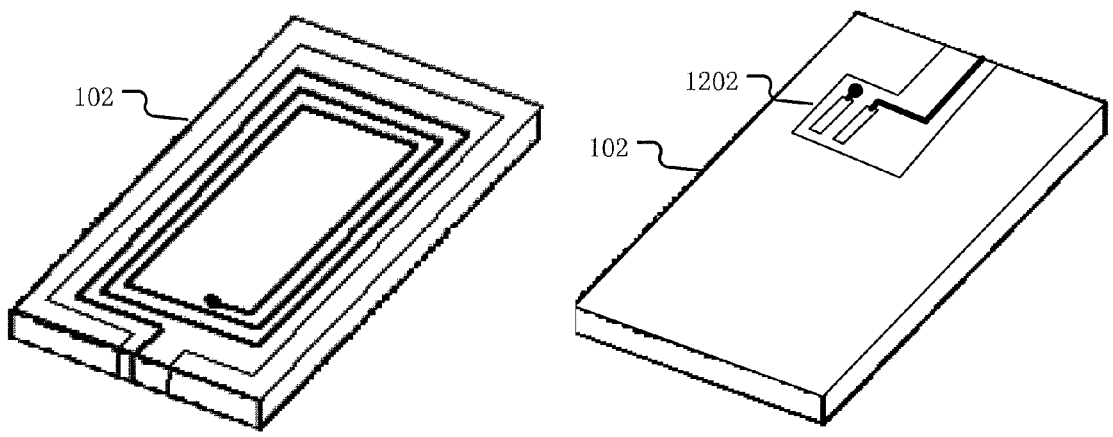
FIGS. 16 and 17 shows top and bottom views of a battery with a contactless communication antenna.

FIGS. 16 and 17 shows top and bottom views of a battery with a contactless communication antenna. The batter 102 has a contactless communication antenna 1202, with electrical contact pads of the contactless communication antenna 1202 folded to place the bulk of the contactless communication antenna and its contact pads on opposing sides of the battery 102.

Figure 18:
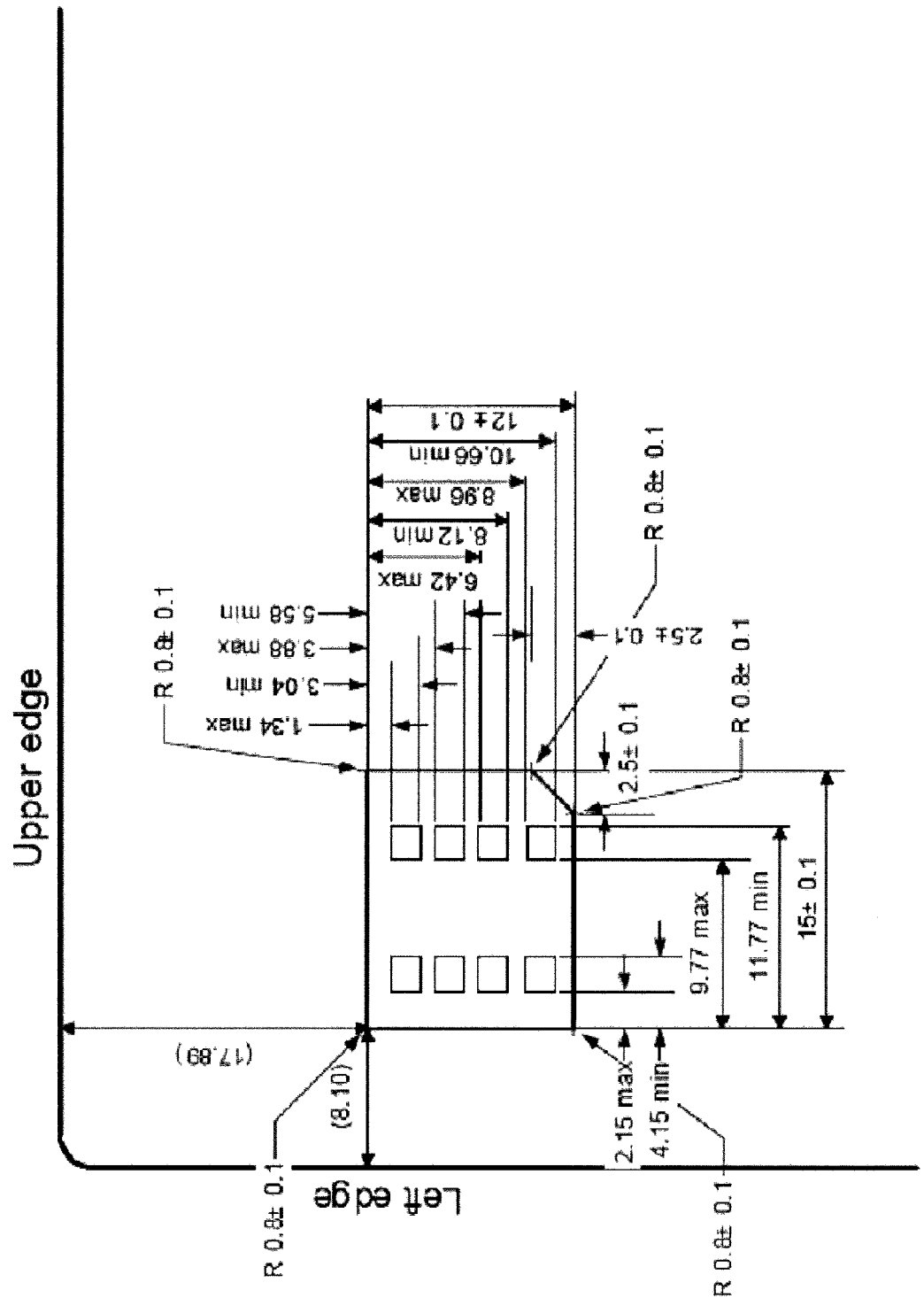
FIG. 18 shows example dimensions of the set of electrical contact pads on embodiments of the printed circuit board complying with ISO 7816.

FIG. 18 shows example dimensions of the set of electrical contact pads on embodiments of the mobile phone smart card complying with ISO 7816. The distance between side walls of the chip card 20 or 100 from a left edge 112 and an upper edge 114 are also shown.

A typical SIM card slot is capable of holding a typical SIM card, which has second size dimensions with a plug-in size of about 25 mm long and 15 mm wide, and less than 1 mm thick. A plug-in SIM card size is for example less than 1 mm thick. Example "mini-sized" SIM cards have size dimensions of 15 mm long, 12 mm wide, and less than 1 mm thick. The SIM card includes at least a subset of contact pads compliant with ISO 7816-2, which includes contact pads 1-8 (C1-C8), defined according to ISO 7816 as follows.

TABLE 1

| Contact Pad | Designation | Description |
| --- | --- | --- |
| C1 | Vcc | Power connection |
| C2 | RST | Reset line |
| C3 | CLK | Clock signal line |
| C4 | RFU | Reserved for future use |
| C5 | GND | Ground line |
| C6 | Vpp | Programming power connection |
| C7 | I/O | Input/output line that provides a half-duplex communication channel between the reader and the smart card |
| C8 | RFU | Reserved for future use |

The contact pads C1, C2, C3, C5, C6, C7 have been assigned as interface pins for use with the functions as described in Table 1. Two of the contact pads, C4 and C8, are listed as reserved for future use. In one embodiment, the contact pads C4 and C8 are used to drive a contactless communication antenna or communicate data for use with a contactless communication antenna. In another embodiment, extra contact pads are added to drive a contactless communication antenna or communicate data for use with a contactless communication antenna.

We claim:

1. An apparatus comprising:
a circuit board having a first principal surface and a second principal surface on opposite sides of the circuit board;
a first set of electrical contact pads on the first principal surface arranged to electrically connect with a mobile phone smart card, such that the first set of electrical contact pads communicates data of the mobile phone smart card for wireless and contactless communication;
a second set of electrical contact pads on the second principal surface arranged to electrically connect with a smart card socket of a mobile phone, such that the second set of electrical contact pads communicates data with the smart card socket of the mobile phone for wireless communication; and
a third set of electrical contact pads arranged on the circuit board to electrically connect with a contactless communication antenna external to the circuit board, such that the third set of electrical contact pads communicates data with the contactless communication antenna supporting contactless communication,
wherein contactless communication is over distances shorter than wireless communication.

2. The apparatus of claim 1, further comprising:
the mobile phone smart card adjacent to the first principal surface of the circuit board.

3. The apparatus of claim 1, further comprising:
the mobile phone including:
the smart card socket adjacent to the second principal surface of the circuit board.

4. The apparatus of claim 1, further comprising:
the contactless communication antenna.

5. The apparatus of claim 1, further comprising:
the mobile phone including:
the smart card socket adjacent to the second principal surface of the circuit board;
the mobile phone smart card adjacent to the first principal surface of the circuit board; and
the contactless communication antenna.

6. The apparatus of claim 1, further comprising:
the mobile phone including:
the smart card socket adjacent to the second principal surface of the circuit board; and
the mobile phone smart card adjacent to the first principal surface of the circuit board.

7. The apparatus of claim 6, further comprising:
a battery providing power to the mobile phone; and
the contactless communication antenna adjacent to the battery.

8. The apparatus of claim 1, further comprising:
the mobile phone including:
the smart card socket adjacent to the second principal surface of the circuit board;
the mobile phone smart card adjacent to the first principal surface of the circuit board;
a housing surrounding the mobile phone including a removable battery cover; and
the contactless communication antenna on the battery cover.

9. The apparatus of claim 1, wherein the mobile phone smart card has contactless communication circuitry, and
wherein the second set of electrical contact pads is electrically connected with at least one electrical contact pad of the first set of electrical contact pads, such that the first and second sets of electrical contact pads directly communicate data between the mobile phone smart card and the smart card socket of the mobile phone for wireless communication; and
wherein the third set of electrical contact pads is electrically connected with at least one electrical contact pad of the first set of electrical contact pads, such that the first and third sets of electrical contact pads directly communicate data between the mobile phone smart card and the contactless communication antenna for contactless communication.

10. The apparatus of claim 1, wherein the mobile phone smart card has contactless communication circuitry, and
wherein the second set of electrical contact pads is electrically connected with at least one electrical contact pad of the first set of electrical contact pads, such that the first and second sets of electrical contact pads directly communicate data between the mobile phone smart card and the smart card socket of the mobile phone for wireless communication; and
wherein the third set of electrical contact pads is electrically connected with at least one electrical contact pad of the first set of electrical contact pads, such that the first and third sets of electrical contact pads directly communicate data between the mobile phone smart card and the contactless communication antenna for contactless communication, and
wherein the first set of electrical contact pads communicates data of the mobile phone smart card, such that the mobile phone smart card has a first plurality of smart card contacts being compliant with ISO 7816, and the mobile phone smart card has extra contacts in addition to the first plurality of smart card contacts supporting contactless communication of the mobile phone.

11. The apparatus of claim 1, further comprising:
at least one integrated circuit on the circuit board processing data of the mobile phone smart card for wireless and contactless communication,
wherein the mobile phone smart card has no contactless communication circuitry.

12. The apparatus of claim 1, further comprising:
at least one integrated circuit on the circuit board processing data of the mobile phone smart card for wireless and contactless communication.

13. The apparatus of claim 1, wherein the first set of electrical contact pads is arranged to electrically connect with a mobile phone smart card compliant with at least ISO 7816 and ISO 14443.

14. The apparatus of claim 1, wherein the first set of electrical contact pads is arranged to electrically connect with a mobile phone smart card compliant with at least ISO 7816 and ISO 15693.

15. The apparatus of claim 1, wherein the second set of electrical pads is arranged to electrically connect with the smart card socket of the mobile phone, such that the smart card socket has a first plurality of socket contacts arranged to connect with the mobile phone smart card being compliant with ISO 7816, and the smart card socket has no extra contacts in addition to the first plurality of socket contacts supporting contactless communication.

16. The apparatus of claim 1, wherein the first set of electrical pads is arranged to electrically connect with the mobile phone smart card, such that the mobile phone smart card has a first plurality of smart card contacts being compliant with ISO 7816, thereby providing the mobile phone with contactless communication despite the mobile phone smart card having no extra contacts in addition to the first plurality of smart card contacts supporting contactless communication.

17. The apparatus of claim 1, wherein the second set of electrical pads is arranged to electrically connect with the smart card socket of the mobile phone, such that the smart card socket has a first plurality of socket contacts arranged to connect with the mobile phone smart card being compliant with ISO 7816, thereby providing the mobile phone with contactless communication despite the smart card socket having no extra contacts in addition to the first plurality of socket contacts supporting contactless communication.

18. The apparatus of claim 1, further comprising:
at least one integrated circuit on the circuit board processing data of the mobile phone smart card for wireless and contactless communication,
wherein the mobile phone smart card has no contactless communication circuitry,
wherein the first set of electrical pads is arranged to electrically connect with the mobile phone smart card, such that the mobile phone smart card has a first plurality of smart card contacts being compliant with ISO 7816, thereby providing the mobile phone with contactless communication despite the mobile phone smart card having no extra contacts in addition to the first plurality of smart card contacts supporting contactless communication.

19. The apparatus of claim 1, further comprising:
at least one integrated circuit on the circuit board processing data of the mobile phone smart card for wireless and contactless communication, wherein the mobile phone smart card has no contactless communication circuitry, wherein the second set of electrical pads is arranged to electrically connect with the smart card socket of the mobile phone, such that the smart card socket has a first plurality of socket contacts arranged to connect with the mobile phone smart card being compliant with ISO 7816, thereby providing the mobile phone with contactless communication despite the smart card socket having no extra contacts in addition to the first plurality of socket contacts supporting contactless communication.

20. The apparatus of claim 1, wherein the first set of electrical pads is arranged to electrically connect with the mobile phone smart card, such that the mobile phone smart card has a first plurality of smart card contacts being compliant with ISO 7816, and wherein the second set of electrical pads is arranged to electrically connect with the smart card socket of the mobile phone, such that the smart card socket has a first plurality of socket contacts arranged to connect with the mobile phone smart card being compliant with ISO 7816, thereby providing the mobile phone with contactless communication, despite the mobile phone smart card having no extra contacts in addition to the first plurality of smart card contacts supporting contactless communication, and despite the smart card socket having no extra contacts in addition to the first plurality of socket contacts supporting contactless communication.

21. The apparatus of claim 1, further comprising:

at least one integrated circuit on the circuit board processing data of the mobile phone smart card for wireless and contactless communication, wherein the mobile phone smart card has no contactless communication circuitry, wherein the first set of electrical pads is arranged to electrically connect with the mobile phone smart card, such that the mobile phone smart card has a first plurality of smart card contacts being compliant with ISO 7816, and wherein the second set of electrical pads is arranged to electrically connect with the smart card socket of the mobile phone, such that the smart card socket has a first plurality of socket contacts arranged to connect with the mobile phone smart card being compliant with ISO 7816, thereby providing the mobile phone with contactless communication, despite the mobile phone smart card having no extra contacts in addition to the first plurality of smart card contacts supporting contactless communication, and despite the smart card socket having no extra contacts in addition to the first plurality of socket contacts supporting contactless communication.

22. A manufacturing method comprising:

providing a circuit board having a first principal surface and a second principal surface on opposite sides of the circuit board;

providing a first set of electrical contact pads on the first principal surface arranged to electrically connect with a mobile phone smart card, such that the first set of electrical contact pads communicates data of the mobile phone smart card for wireless and contactless communication;

providing a second set of electrical contact pads on the second principal surface arranged to electrically connect with a smart card socket of a mobile phone, such that the second set of electrical contact pads communicates data with the smart card socket of the mobile phone for wireless communication; and providing a third set of electrical contact pads arranged on the circuit board to electrically connect with a contactless communication antenna external to the circuit board, such that the third set of electrical contact pads communicates data with the contactless communication antenna for contactless communication, wherein contactless communication is over distances shorter than wireless communication.

23. An apparatus comprising:

first principal surface means for connecting with a mobile phone smart card, to communicate data of the mobile phone smart card for wireless and contactless communication;

second principal surface means for connecting with a smart card socket of a mobile phone to communicate data with a smart card socket of a mobile phone for wireless communication; and means for connecting with a contactless communication antenna external to the circuit board to communicate data with the contactless communication antenna for contactless communication, wherein contactless communication is over distances shorter than wireless communication; and means for supporting the first principal surface means for connecting with a mobile phone smart card, the second principal surface means for connecting with the smart card socket, and the means for connecting with a contactless communication antenna, wherein the means for supporting has a first principal surface with the first principal surface means and a second principal surface with the second principal surface means, the first principal surface and the second principal surface on opposite sides of the means for supporting.

* * * * *